United States Patent [19]

Budnick

[11] 4,192,768

[45] Mar. 11, 1980

[54] ELECTRICAL TERMINAL CORROSION PREVENTATIVE AND METHOD FOR USING SAME

[76] Inventor: Stanley F. Budnick, 1072 E.Broadway, Winona, Minn. 55987

[21] Appl. No.: 880,337

[22] Filed: Feb. 23, 1978

[51] Int. Cl.$^2$ .................. C23F 11/04; C23F 11/12; C23F 11/18

[52] U.S. Cl. .................. 252/389 R; 106/14.21; 106/14.33; 252/40.7; 252/42.1; 252/147; 422/12

[58] Field of Search .............. 252/389 R, 40.7, 42.1, 252/147; 106/14.21, 14.33; 422/12

[56] References Cited

U.S. PATENT DOCUMENTS

| | | | |
|---|---|---|---|
| 1,562,489 | 11/1925 | Bass | 106/14.33 |
| 2,690,998 | 10/1954 | Dilworth et al. | 252/389 R |
| 3,730,895 | 5/1973 | Kjonaas | 252/389 R |
| 3,833,513 | 9/1974 | Fath | 252/389 R |
| 3,856,687 | 12/1974 | Loup | 252/389 R |

*Primary Examiner*—Benjamin R. Padgett
*Assistant Examiner*—Irwin Gluck
*Attorney, Agent, or Firm*—Merchant, Gould, Smith, Edell, Welter & Schmidt

[57] ABSTRACT

An electrical terminal corrosion preventative generally comprising a major proportion of a paste-like, heat resistant, lubricating grease having a dropping point of at least 250° F. and a water soluble inorganic acid neutralizing agent. The electrical terminal corrosion preventative further includes water and an emulsifying agent capable when combined with the water and the neutralizing agent of facilitating substantially uniform dispersion of the combined water and neutralizing agent in the grease, the neutralizing agent being active to neutralize an acid when the neutralizing agent is dispersed in the grease. A method is also disclosed for using the corrosion preventative for preventing corrosion to electrical terminals and the like.

22 Claims, No Drawings

ELECTRICAL TERMINAL CORROSION PREVENTATIVE AND METHOD FOR USING SAME

FIELD OF THE INVENTION

My invention relates to corrosion preventatives, in particular battery corrosion preventatives. My invention further relates to a method for using a battery corrosion preventative for preventing corrosion to battery terminals and the like:

BACKGROUND OF THE INVENTION

Most automobile and truck batteries contain some form of acid. The acid, through charging, gives off fumes which condense on the battery surface. When the acid fumes condense on the terminals they begin to corrode them in a short time so as to make the connections to the battery less conductive and eventually nonconductive. This problem causes a malfunction in the entire electrical system. The result to industry is lost man hours as well as monetary loss. Also, starting time in the winter is greatly affected due to battery corrosion.

I have tried a number of different types of lubricating greases in combination with an acid neutralizing agent such as sodium bicarbonate to correct the problem of corrosion to the battery. One such composition that I tried was sodium bicarbonate with vaseline or similar types of petroleum jelly. The main problem I found out by trying this composition was that in summer months it would melt from the heat of the sun and engine temperature which can be quite high in many instances. I also tried other forms of lubricating grease such as chassis gear grease in combination with the sodium bicarbonate. However, I found that many of the greases that I tried insulated or deactivated the sodium bicarbonate so that it would no longer function to neutralize the acid.

SUMMARY OF THE INVENTION

I have invented a new and useful electrical terminal corrosion preventative which is heat resistant and which does not deactivate or insulate the acid neutralizing agent. My electrical termainal corrosion preventative includes a major proportion of a paste-like, heat resistant lubricating grease which has a Dropping Point of at least 250° F. and a water soluble inorganic acid neutralizing agent. My corrosion preventative further includes water and an emulsifying agent capable when combined with the water and the neutralizing agent of facilitating substantially uniform dispersion of the combined water and the neutralizing agent in the grease, the neutralizing agent being active to neutralize an acid when the neutralizing agent is dispersed in the grease.

I have also invented a new and useful method for preventing corrosion to electrical terminals comprising the step of treating at least one of the terminals with an effective amount of a corrosion preventative composition according to my invention.

DEFINITIONS

"API" is an abbreviation for American Petroleum Institute.

"SUS" is an abbreviation for Saybolt Universal Seconds.

"ASTM" is an abbreviation for American Society for Testing Materials.

"FFA" is an abbreviation for Free Fatty Acid.

The term "mineral oil" includes any liquid product of petroleum within the viscosity range of products commonly called oil.

The term "white mineral oil" includes those mineral oils which are characterized as being colorless, transparent, oily liquids that are almost tasteless, odorless, have a specific gravity of 0.828–0.880, are soluble in ether, chloroform, carbon disulfide, benzine, benzene, boiling alcohol, and fixed or volatile oils and are insoluble in water, cold alcohol and glycerine. They are derived from the distillation of high boiling (330°–390° C.) petroleum fractions.

The term "lubricating grease" includes mixtures of mineral oil or oils with one or more metallic soaps. The most common soaps are those with sodium, calcium, barium, aluminum, lead, lithium, potassium and zinc.

The term "lithium grease" includes lubricating greases using lithium soaps of the higher fatty acids. One lithium soap known to be utilized in lubricating greases is lithium stearate.

The term "oxidation inhibiter" includes those compounds which increase the corrosion resistance and heat resistant properties of lubricating greases. Oxidation inhibiters known in the art for use in lubricating greases include various amines, phenols, compounds of the oxygen and sulphur groups, organic phosphites and dialkyl selenides or tellurides.

The term "napthenic oil" includes those petroleum oils containing a relatively large percentage of napthenes, e.g. cycloaliphatic hydrocarbons having a five member or six member carbon ring.

The term "corrosion preventative" includes electrical terminal corrosion preventatives, battery terminal corrosion preventatives and the like. The corrosion preventative can comprise, consist essentially of or consist of the ingredients hereinbefore and hereinafter set forth.

LUBRICATING GREASE

Lubricating greases useful in practicing my invention have a smooth or buttery texture, e.g. paste-like. They are generally heat resistant or stable, e.g. do not dissolve, melt or break down at high temperatures and are usually corrosion resistant. In particular, lubricating greases useful in my invention are substantially cohesive at temperatures normally encountered under the hood of an automobile or other similar motor vehicle, such temperatures sometimes reaching 300° F. These lubricating greases have a Dropping Point of at least 250° F. and preferably have a Dropping Point of at least 300° F. to ensure that the lubricating grease does not break down under engine hood temperatures.

These lubricating greases normally include a metallic soap, e.g. a calcium or lithium soap, an oxidation inhibiter to provide the heat stability and a mineral oil such as white mineral oil to improve the viscosity of the grease. One such grease useful in practicing my invention is manufactured by Union Oil and is known as UNION FM Grease. UNION FM grease includes an effective inhibiter plus basic oxide fillers to combat the effects of fruit, vegetable and salt solutions encountered in food processing. UNION FM grease further includes an oxidation inhibiter to prevent deterioration of the grease at maximum operating temperatures. UNION FM grease also includes a high quality calcium soap to contribute good shear stability and low oil separation. To provide mobility at low ambient temperatures, UNION FM grease further includes a white mineral oil of relatively low viscosity. The characteristics of UNION FM grease can be found in a publication entitled "Product Data Sheet" dated October, 1970 and are as follows:

UNION FM GREASE DATA TABLE

| | |
|---|---|
| Grade | 2 |
| Penetration at 77° F.,ASTM Worked | 280 |
| Dropping Point,ASTM, °F. | 250 |
| Color | White |
| Texture | Buttery |
| Calcium Soap,wt% | 8.0 |
| Base Oil Data | |
| Viscosity, SUS at 100° F. | 325 |
| Pour Point, °F. | 5 |

Lubricating greases preferred for my invention are lithium greases which are generally lead free. Most lubricating greases contain lead which is undesirable for reasons soon to follow. One such lithium grease is manufactured by Mobil Oil Products and goes under the name of MOBILUX. MOBILUX is basically a lithium soap grease containing oxidation inhibitors and a mineral oil to control viscosity. The characteristics of MOBILUX are as follows:

| Product | NLGT Grade | Soap Type | Grease Characteristics Penetration at 77° F. Wked | Struct | Color ASTM | Mineral Oil Viscosity SUS at 100° F. | SUS at 210° F. | Drop Pl. ASTM °F. |
|---|---|---|---|---|---|---|---|---|
| Mobilux 2 | 2 | Lithium | 260-290 | Smooth | Brown | — | 57 | 350 |

Another such lithium grease is manufactured by Citgo and goes under the name CITGO Premium Lithium Grease. CITGO Premium Lithium Grease generally includes a lithium based grease, an additive treatment to impart high level inhibition against oxidation and corrosion and a high quality solvent refined base stock. The characteristics of three different grades of CITGO Premium Lithium Grease can be found in a publication entitled "Product Bulletin" put out by CITGO and dated December 1, 1973 and are as follows:

| SPECIFICATIONS: | CITGO PREMIUM LITHIUM GREASE | | |
|---|---|---|---|
| Grade | No. 1 | No. 2 | No. 3 |
| NLGI Grade | 1 | 2 | 3 |
| Soap | Lithium | Lithium | Lithium |
| Texture | Smooth Buttery | Smooth Buttery | Smooth Buttery |
| Color | Amber | Amber | Amber |
| Dropping Point, °F. Min. | 350 | 360 | 360 |
| Penetration at 77° F., ASTM D217 | | | |
| Unworked (1) | +20/−20 | +20/−20 | +20/−20 |
| Worked 60 strokes | 315-335 | 270-290 | 225-245 |
| Worked 10,000 strokes (2) | +20/−20 | +20/−20 | +20/−20 |
| Water, % Max. | 0.2 | 0.2 | 0.2 |
| Water Resistance, % Max. ASTM D1264 | 10 | 5 | 5 |
| FFA (as Oleic), % Max. | 0.3 | 0.3 | 0.3 |
| Free Alkali (as LiOH . H$_2$O), % Max. | 0.2 | 0.2 | 0.2 |
| Storage Stability (3) | Pass | Pass | Pass |
| Wheel Bearing Test, ASTM D1263 (7) | Pass | Pass | Pass |
| Corrosion (4) | Pass | Pass | Pass |
| Oxygen Bomb 200 Hrs., Lbs. Drop Max. | 10 | 10 | 10 |
| Dirt Count (5) | Pass | Pass | Pass |
| Rust Preventive Properties, ASTM D1743 | 1 | 1 | 1 |
| Mineral Oil | | | |
| Viscosity, SUS at 100° F. (6) | 1068 | 1068 | 1068 |
| Viscosity, SUS at 210° F. | 75-85 | 75-85 | 75-85 |

Notes:
(1) The unworked penetration shall not differ from the worked 60 strokes penetration by more than the amount indicated.
(2) The penetration after working 10,000 strokes shall not change from the worked 60 strokes penetration by more than the amount indicated.
(3) The worked 60 strokes penetration shall not change more than 20 points during six months storage.
(4) Per Military Specification MIL-G-10924A.
(5) Federal Standard No. 791, Method 3005.1 - The grease shall not contain dirt or other foreign particles exceeding the following limits: 7,500 per cu. cm. of 25 microns diameter or above. 1,600 per cu. cm. of 75 microns diameter or above. None of 125 microns or above.
(6) Approximate - for information only.
(7) Maximum leakage of 10 grams on No. 1 Grade. 5 grams on heavier grades.

My battery corrosion preventative includes a major portion of the lubricating grease, e.g. 50% to 90% by weight of the total battery corrosion preventative.

Acid Neutralizing Agent

Acid neutralizing agents useful in practicing my corrosion preventative are water soluble and inorganic. The neutralizing agent is preferably used to neutralize the battery acid which is usually sulphuric acid. The neutralizing agent is preferably a buffering agent capable of neutralizing large amounts of battery acid. A preferred neutralizing agent is sodium bicarbonate because of the economics involved and because of its superior ability to neutralize battery acid. However, any water soluble bicarbonate, e.g. potassium or lithium bicarbonate, can be used which has characteristics similar to sodium bicarbonate in neutralizing battery acid.

The amount of the neutralizing agent can range from six to fifteen or twenty percent by weight of the total of my corrosion preventative. It is preferred in order to obtain best results that the ratio of the neutralizing agent to the lithium grease be one part neutralizing agent to eight to ten parts lubricating grease.

Water

My corrosion preventative can use broadly any form of water, e.g. tap water. However, I prefer to use distilled water because it ensures greater shelf life of my corrosion preventative.

Emulsifying Agent

Emulsifying agents useful in practicing my corrosion preventative are capable, when combined with the water and the neutralizing agent of facilitating substantially uniform dispersion of the combined water and neutralizing agent in the lubricating grease. It is my belief that this dispersing effect is the reason why the neutralizing agent remains active when dispersed in the lubricating grease. Without the emulsifying agent and water combination, the neutralizing agent tends to deactivate after a certain period of time.

One such emulsifying agent preferred in practicing my invention is an emulsifying oil manufactured by Union Oil and is known as Union Soluble Oil. Union Soluble Oil is a composite oil that emulsifies easily with water and is used primarily as a coolant and lubricant in machining and grinding operations and as a rust preventative. Union Soluble Oil includes a napthenic oil compounded with selected emulsifying and coupling agents to emulsify instantly into a stable creamy white emulsion. The characteristics of three grades of this Union Soluble Oil can be found in a publication entitled "Product-Application Sheet" dated May, 1970 and are as follows:

| Grade | 10 | 12 | HD |
|---|---|---|---|
| Gravity, °API | 20.6 | 16.3 | 16.1 |
| Viscosity SUS at 100° F. | 244 | 295 | 238 |
| Neutralization Number | 1.2 | 1.2 | 0.7 |
| Ash, Sulfated, wt. % | 1.6 | 1.9 | 2.8 |
| Carbon Residue, Rams, wt % | 2.5 | 3.1 | 4.5 |
| Sulfur | — | — | 3.5 |
| Copper Corrosion, 3 hours at 212° F. | 1a | 1a | 4c |
| Ease of Emulsification | Pass | Pass | Pass |
| Emulsion Stability | Pass | Pass | Pass |

The amount of the emulsifying agent used in my invention generally relates to the emulsifying agent-water ratio. The ratio of emulsifying agent to water can vary from 1:4 to 4:1 parts by weight. However, I prefer a 1:1 part by weight ratio for best dispersion characteristics of the emulsifying agent-water combination. The emulsifying agent-water combination can vary from 4 to 8% by weight of the total of my corrosion preventative but is preferable about 6% by weight. The emulsifying agent and water are preferably mixed together prior to adding to the remainder of the ingredients of my corrosion preventative.

Anti-Freeze Agent

When conditions require it, my battery corrosion preventative can include an effective amount of an anti-freeze agent to prevent detrimental effects to its viscosity characteristics. Anti-freeze agents which can be used in practicing my invention include ethyl alcohol and ethylene glycol whether in pure form or as part of a typical anti-freeze composition. Ethylene glycol is preferred as the anti-freeze agent because it is less of an explosion and fire hazard than ethyl alcohol. The amount of anti-freeze agent whether in pure form or as part of a total anti-freeze composition can vary from 2 to 3 or 4% by weight of my battery corrosion preventative.

Smell and Odor Modifying Substances

Because many of the lubricating greases useful in my invention are very messy and unpleasant smelling and are frequently handled by hand, I have found it frequently desirable to add a smell or odor modifying substance to my battery corrosion preventative. The preferred smell and odor modifying substance in practicing my invention is anise oil which usually has a smell suggestive of licorice. However, other smell and odor modifying substances known to the art can be used which have smell and odor characteristics similar to anise oil.

When a smell or odor modifying substance is used in my battery corrosion preventative, it is preferred that the lubricating grease be lead free to prevent someone, e.g. a small child, from being poisoned by accidentally eating a lead containing lubricating grease.

Miscellaneous

When desirable, suitable colorants and pigments known to the art can be added to my battery corrosion preventative which do not affect its basic characteristics. Likewise, the color of the paint pigment and colorants can vary according to the taste of the user of my corrosion preventative.

Example

One particular formula according to my invention which I have found useful is as follows (percentages by total weight of the composition):

83.3% lithium grease (lithium soap, oxidation inhibiter and mineral oil)
8.3% sodium bicarbonate
2.8% distilled water
2.8% ethylene glycol based anti-freeze;
2.79% emulsifying oil (naphthenic oil, emulsifying agent and coupling agent)
0.01% anise oil Battery corrosion preventatives according to my invention are usually compounded according to the following batch formula:

120 lbs. lithium grease (lithium soap, oxidation inhibiter and mineral oil)
12–15 lbs. sodium bicarbonate
2 qts. ethylene glycol based anti-freeze;
2 qts. distilled water
2 qts. of emulsifying oil (naphthenic oil, emulsifying agent and coupling agent)
2 oz. anise oil 5 oz. paint pigment When compounding the mixture according to this batch formula, the distilled water and the emulsifying oil are mixed together prior to addition to the remaining ingredients.

Method of Preventing Corrosion to a Battery

I have found that corrosion preventative according to my invention are extremely useful in treating the terminals of the battery and preferably the terminal connectors as well when an effective amount of my battery corrosion preventative is applied. The preferred method for applying my battery corrosion preventative is by coating the affected surfaces with a battery corrosion preventative according to my invention such as by using one's own fingers or a brush.

Battery corrosion preventatives according to my invention can be applied to the desired surfaces when the battery is new or after it has been used for a while. When the battery is not new, it is preferable to perform a pre-corrosion cleaning treatment for maximum effectiveness of the battery corrosion preventative. This pre-cleaning is preferably performed by applying by suitable means such as spraying, wiping, etc. a corrosion cleaning solution to the terminals of the battery and preferably also to the terminal connectors. A corrosion cleaning solution which I have found most effective includes water, sodium bicarbonate, and a water penetration increasing agent in a small but effective amount. Preferably, the cleaning solution is aqueous. A preferred method according to my invention for preventing corrosion to the battery when using the pre-cleaning treatment is as follows. The terminal connectors are first removed. Then the terminals of the battery and the terminal connectors are cleaned such as by using a wire brush, sandpaper, or other abrasive method. If the battery has been in use for some length of time, special care should be taken to clean the terminals and the terminal connectors thoroughly. The corrosion cleaning solution is then sprayed liberally on the terminals of the battery and the terminal connectors if the battery is new or on the terminals, terminal connectors and top surface of an old battery. The cleaning solution is then spread such as by using one's own fingers or a small brush for complete coverage. The cleaning solution is then allowed to remain on the terminals, terminal connectors and the like for three to five minutes. Then, the terminals, terminal connectors and the like are rinsed with a clear solution of water to remove the cleaning solution. Next, a battery corrosion preventative according to my invention is coated on the battery terminals below the level where the terminal connectors are attached thereto. The terminal connectors are then replaced and tightened securely to the terminals of the battery. The terminal connectors and any exposed surface of the terminals of the battery are completely coated. Preferably, the battery corrosion preventative according to my invention is liberally and evenly spread to insure complete coverage. If desired, protective battery terminal covers made of a suitable material such as plastic and out of suitable colors, e.g., red on the positive terminal and green on the negative terminal, are installed after treatment. Under normal condition, battery corrosion preventatives according to my invention will prevent terminal corrosion for the life of the battery. However, it is desirable that the terminal covers be periodically removed to check for any evidence of corrosion.

I claim:

1. An electrical terminal corrosion preventative, comprising:
   a major proportion of a paste-like, heat resistant lubricating grease having a Dropping Point of at least 250 degrees Fahrenheit;
   a water soluble inorganic acid neutralizing agent; water;
   an emulsifying agent capable when combined with said water and said neutralizing agent of facilitating substantially uniform dispersion of said combined water and neutralizing agent in said grease, said neutralizing agent being active to neutralize an acid when said neutralizing agent is dispersed in said grease.

2. The corrosion preventative of claim 1 wherein said grease has a Dropping Point of at least 300° Fahrenheit.

3. The corrosion preventative of claim 1 wherein said grease comprises a member from the group consisting of calcium and lithium soaps.

4. The corrosion preventative of claim 1 wherein said grease comprises a lithium grease having a Dropping Point of about 350° Fahrenheit.

5. The corrosion preventative of claim 1 wherein said neutralizing agent is in an amount of from 6% to 20% by weight of the corrosion preventative.

6. The corrosion preventative of claim 5 wherein said neutralizing agent comprises sodium bicarbonate.

7. The corrosion preventative of claim 5 wherein the radio of said neutralizing agent to said grease is 1:10 to 1:8 parts by weight.

8. The corrosion preventative of claim 1 wherein said emulsifying agent and water combined is in an amount of from 4% to 8% by weight of the corrosion preventative.

9. The corrosion preventative of claim 8 wherein the ratio of said emulsifying agent to said water is from 1:4 to 4:1 parts by weight.

10. The corrosion preventative of claim 9 wherein said emulsifying agent to water ratio is 1:1 parts by weight.

11. The corrosion preventative of claim 8 wherein said combined amount of said emulsifying agent and water is 6% by weight of the corrosion preventative.

12. The corrosion preventative of claim 1 further comprising an antifreeze agent in an amount of from 2% to 4% by the weight of the corrosion preventative.

13. The corrosion preventative of claim 12 wherein said antifreeze agent comprises a member from the group consisting of ethyl alcohol and ethylene glycol.

14. A method for preventing corrosion to a battery, comprising the step of:
    treating at least one electrical terminal with an effective amount of the corrosion preventative of claim 1.

15. The method of claim 14 wherein said treating step comprises completely coating the corrosion preventative on the exposed surface of the electrical terminal.

16. The method of claim 14 comprising the further step of cleaning the electrical terminal prior to said treating step.

17. The method of claim 16 wherein said cleaning step comprises applying a cleaning solution to the electrical terminal.

18. The method of claim 17 wherein the cleaning solution comprises an aqueous solution of sodium bicarbonate.

19. A method of preventing corrosion to an electrical terminal comprising the step of:

treating the electrical terminal with an effective amount of the corrosion preventative of claims 4, 6, 7 or 10.

20. A battery corrosion preventative, comprising:

83.3% by weight of a lithium lubricating grease, including a lithium soap, an oxidation inhibiter and a mineral oil;

8.3% by weight of sodium bicarbonate;

2.8% by weight of distilled water;

2.79% by weight of an emulsifying oil capable when combined with said water and said bicarbonate of facilitating substantially uniform dispersion of said combined water and bicarbonate in said grease, said emulsifying oil including a napthenic oil an emulsifying agent and a coupling agent;

2.8% by weight of an ethylene glycol based antifreeze; and 0.01% by weight of anise oil.

21. A method for preventing corrosion to a battery, comprising the steps of:

spraying a liquid corrosion cleaning solution on the terminals of the battery and the terminal connectors, said cleaning solution including water, sodium bicarbonate and a water penetration increasing agent in an effective amount;

spreading the cleaning solution over the terminals and the terminal connectors;

allowing the cleaning solution to remain on the terminals and the terminal connectors for three to five minutes;

rinsing the terminals and the terminal connectors with a clear solution of water to remove the cleaning solution;

drying the terminals and the terminal connectors; and coating the terminals and the terminal connectors with the corrosion preventative of claim 20.

22. An electrical terminal corrosion preventative, comprising:

120 pounds of a lithium grease, said grease including a lithium soap, an oxidation inhibitor and a mineral oil;

12 to 15 pounds of sodium bicarbonate;

3 quarts of an ethylene glycol based antifreeze;

2 quarts of distilled water;

2 quarts of an emulsifying oil, said emulsifying oil including a naphthenic oil, an emulsifying agent and a coupling agent;

2 ounces of anise oil; and 5 ounces of paint pigment.

* * * * *